(12) United States Patent
Wallash et al.

(10) Patent No.: US 7,957,083 B2
(45) Date of Patent: Jun. 7, 2011

(54) METHOD FOR EARLY DETECTION OF MAGNETIC HEAD DEGRADATION DUE TO CARBON OVERCOAT WEAR

(75) Inventors: Albert John Wallash, Morgan Hill, CA (US); Hong Zhu, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 298 days.

(21) Appl. No.: 11/781,898

(22) Filed: Jul. 23, 2007

(65) Prior Publication Data

US 2009/0029188 A1 Jan. 29, 2009

(51) Int. Cl.
*G11B 27/36* (2006.01)

(52) U.S. Cl. .......................................... 360/31

(58) Field of Classification Search .................. None
See application file for complete search history.

(56) References Cited

U.S. PATENT DOCUMENTS

| | | | |
|---|---|---|---|
| 6,266,199 B1 * | 7/2001 | Gillis et al. | 360/31 |
| 6,275,029 B1 * | 8/2001 | Schaff | 324/212 |
| 6,504,662 B2 | 1/2003 | Sobey | 360/25 |
| 6,683,736 B2 | 1/2004 | Takahashi | 360/31 |
| 6,822,814 B2 | 11/2004 | Ng et al. | 360/31 |
| 2005/0030660 A1 * | 2/2005 | Bang et al. | 360/31 |

FOREIGN PATENT DOCUMENTS

| | | |
|---|---|---|
| JP | 62183003 | 8/1987 |
| JP | 3194765 | 8/1991 |
| JP | 8249607 | 9/1996 |
| JP | 8255302 | 10/1996 |
| JP | 9198623 | 7/1997 |
| JP | 9282601 | 10/1997 |
| JP | 10172101 | 6/1998 |
| JP | 2000251203 | 9/2000 |
| JP | 200114603 | 1/2001 |
| JP | 2002092810 | 3/2002 |
| JP | 2004296033 | 10/2004 |
| JP | 200592988 | 4/2005 |

OTHER PUBLICATIONS

Kimball et al., "In-Situ Disk Durability Monitoring" IBM Technical Disclosure Bulletin Jun. 1996.
Contreras et al., "DC MR Preamplifier with Short Circuit Protection" IBM Technical Disclosure Bulletin Nov. 1993.
Zhao et al., "Effect of Head Slider DLC Overcoats Produced by Various Deposition Techniques on the Interface Failure" IEEE Transactions on Magnetics, vol. 36, No. 5, Sep. 2000.
Wang et al., "Thermal Asperities Sensitivity to Particles: Methodology and Test Results" Transactions of the ASME vol. 123, Apr. 2001.

* cited by examiner

*Primary Examiner* — Daniell L Negrón
(74) *Attorney, Agent, or Firm* — Zilka-Kotab, PC (57) ABSTRACT

A method for detecting an impending failure of a disk drive system. The method includes monitoring a signal from a magnetoresistive sensor for the presence of a negative signal spike. A negative signal spike can indicate that the carbon overcoat of the magnetic medium has been locally worn off. The resulting localized absence of carbon overcoat causes the magnetoresistive sensor to short to the magnetic medium. This causes a short, abrupt drop in voltage, which can be used as evidence of the localized absence of the carbon overcoat. If such a negative signal spike is detected, the user can be notified of an impending system failure. In addition to, or in lieu of, notifying the user of the impending system failure, the system can be automatically de-activated to prevent data loss and/or further damage to the recording system.

9 Claims, 9 Drawing Sheets

METHOD FOR EARLY DETECTION OF MAGNETIC HEAD DEGRADATION DUE TO CARBON OVERCOAT WEAR

FIELD OF THE INVENTION

The present invention relates to magnetic data recording, and more particularly to a method for early detection of carbon overcoat degradation on a magnetic medium of a data recording system.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The magnetic disk includes a magnetic media and is coated with a hard coating such as a layer of carbon, referred to as a carbon overcoat (COC). This COC is critical to maintaining the media and the magnetic head in working order. For example, the COC prevents the magnetic media from corroding and also protects the magnetic media from damage such as from contact with the slider. The COC also prevents the magnetic head from contacting the magnetic media, thereby preventing catastrophic shorting of the magnetic head as well as physical damage to the magnetic head.

Sometimes however, the COC can become compromised. For example at an asperity where the surface of the media has a bump or high point, the carbon overcoat can be worn off by contact with the slider. Over time, this causes fatal damage to the magnetic media and to the magnetic head on the slider, eventually resulting in loss of data and complete failure of the magnetic data recording system. While early detection would be beneficial to preventing such data loss and further damage to the data recording system, no method has previously existed for detecting such COC degradation at an early stage. Therefore, there remains a strong felt need for a method, system or structure that can allow such carbon overcoat (COC) degradation to be detected as soon as such degradation manifests itself.

SUMMARY OF THE INVENTION

The present invention provides a method for the early detection of carbon overcoat degradation in a magnetic data recording system. A signal from a magnetoresistive sensor is monitored for the presence of negative signal spikes. The presence of such negative signal spikes can indicate that the carbon overcoat of the magnetic medium has been compromised.

If such as negative signal spike has been detected, a message can be generated alerting a user of an impending system failure. This can advantageously allow the user to back up valuable date before such data has been lost due to system failure.

In addition to, or in lieu of, notifying the user of an impending system failure, logic and or circuitry can be implemented to automatically de-activate the data storage system if such as negative signal spike is detected.

The notification of impending system failure and/or de-activation of the system can be set to occur if the negative signal spike has an amplitude greater than a predetermined signal amplitude value. This will prevent false alarms as a result of the detection of other signal anomalies, unrelated to the degradation of the carbon overcoat.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
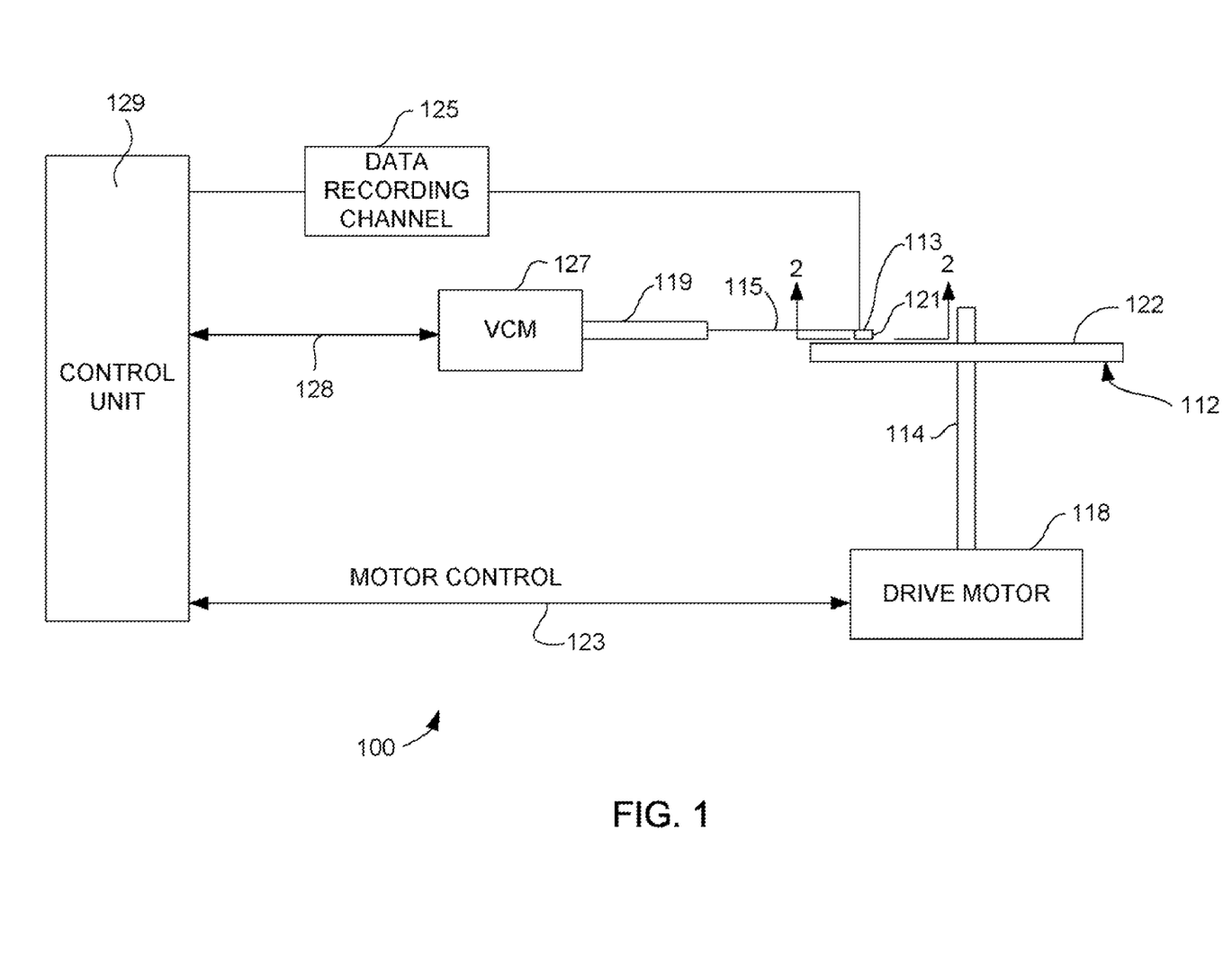
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk, surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
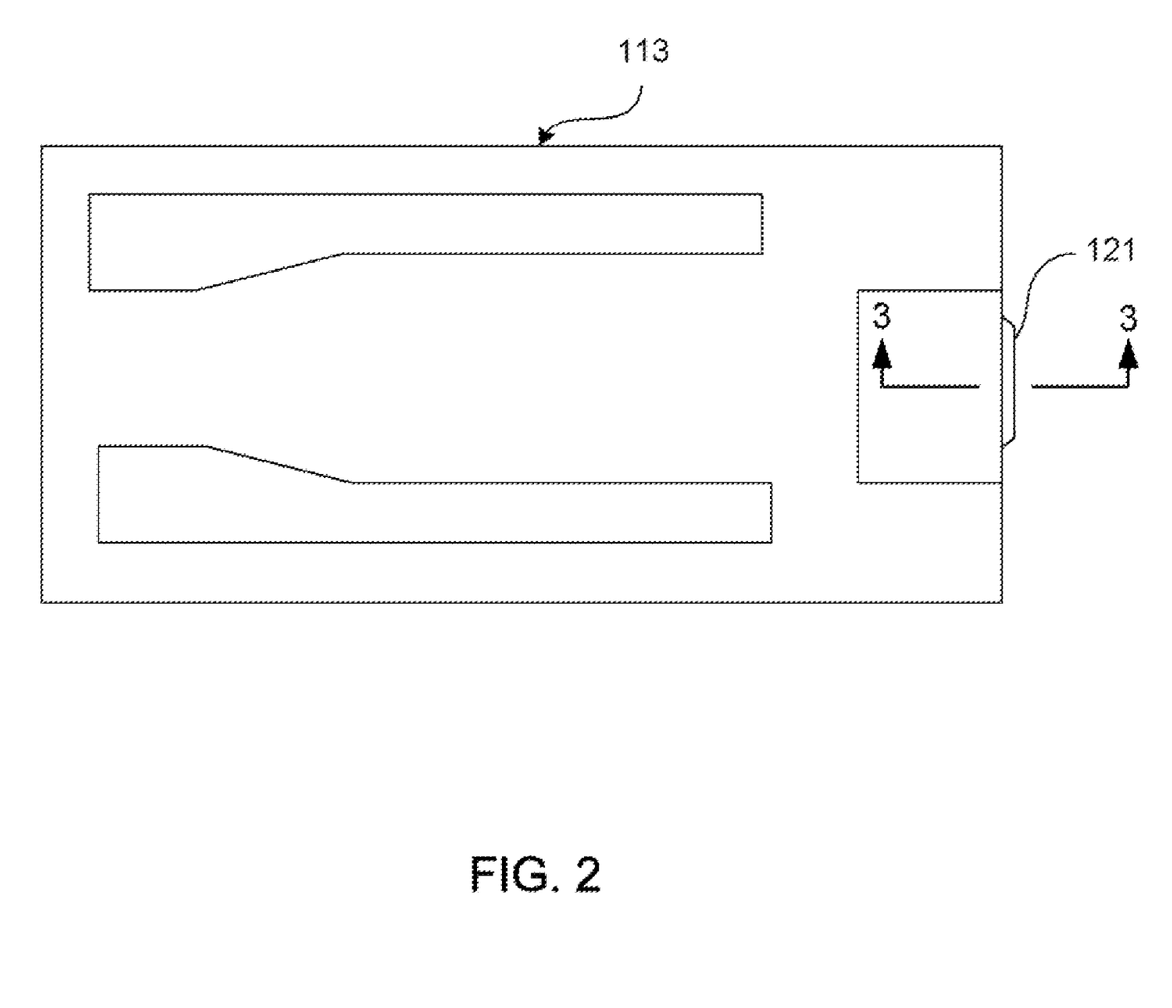
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
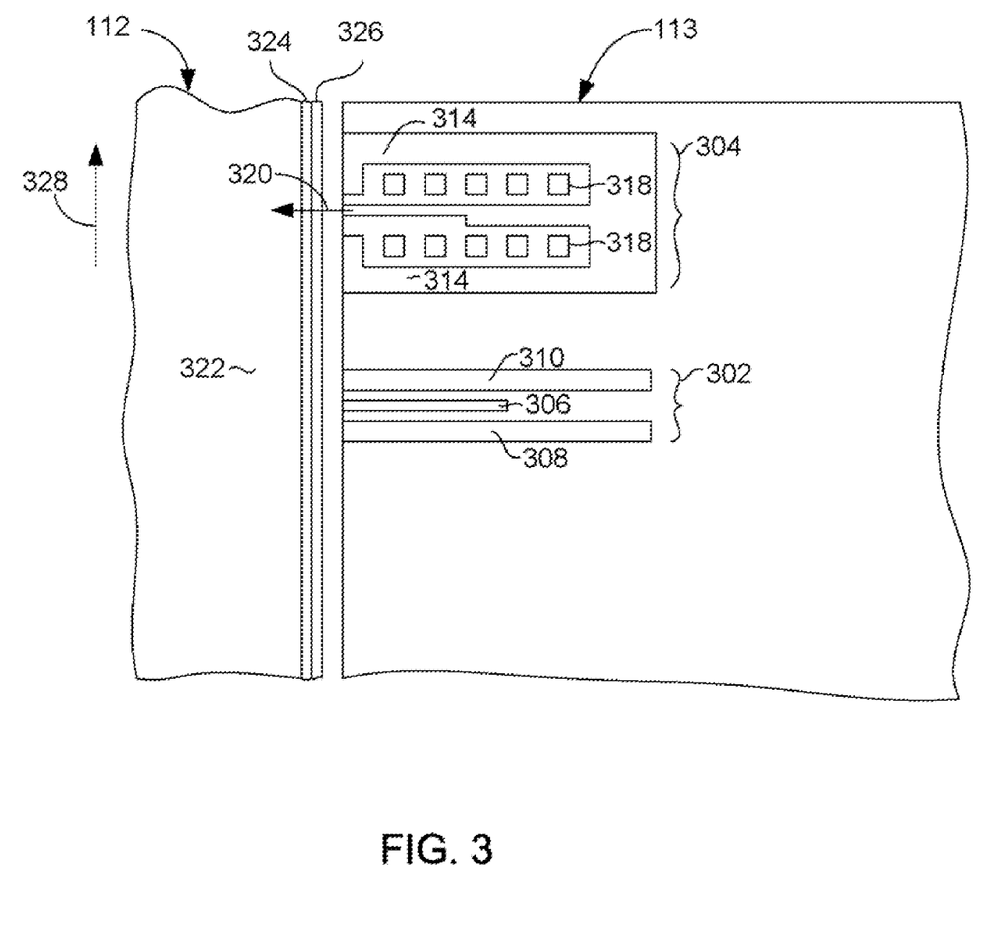
FIG. 3 is a cross sectional view, taken from line 3-3 of FIG. 2 and rotated 90 degrees counterclockwise, of a magnetic head.

With reference now to FIG. 3, a trailing portion of the slider 113 is shown enlarged and in relation to a portion of the magnetic disk 112. Although the slider 113 and disk 112 are shown and described in terms of a perpendicular magnetic data recording system, this is for purposes of illustration only. The invention described herein is equally effective with use in a longitudinal data recording system.

With continued reference to FIG. 3, the slider 113 includes a magnetic read head 302 and a magnetic write head 304, formed at a trailing edge thereof. The read head 302 includes a magnetoresistive sensor 306 such as a giant magnetoresistive sensor (GMR), tunnel magnetoresistive sensor TMR, etc. The sensor 306 can be virtually any type of magnetoresistive sensor. The sensor 306 can be disposed between first and second magnetic shields 308, 310.

The write head 304 includes a magnetic write pole 312 and can include one or more magnetic return poles 314, which can be magnetically connected with the write pole at a back gap region 316. An electrically conductive write coil 318 passes through the write head 304 to induce a magnetic field 320 emitted from the write pole 312 and returning through the return poles 314.

The magnetic disk 112 can include a soft magnetic underlayer 322 and thin, magnetically hard top layer 324. A hard overcoat such as a carbon overcoat (COC) 326 covers the surface of the magnetic disk 112 forming a barrier between the slider 113 and the magnetic layers 322, 324. During operation, the magnetic disk 112 moves relative to the slider 113 as indicated by the arrow 328. The magnetic field 320 from the write pole magnetizes the thin, hard magnetic top layer 324, thereby writing a magnetic, bit of information. This magnetic bit can then be read by the magnetoresistive sensor 306 of the read head 302.

Figure 4:
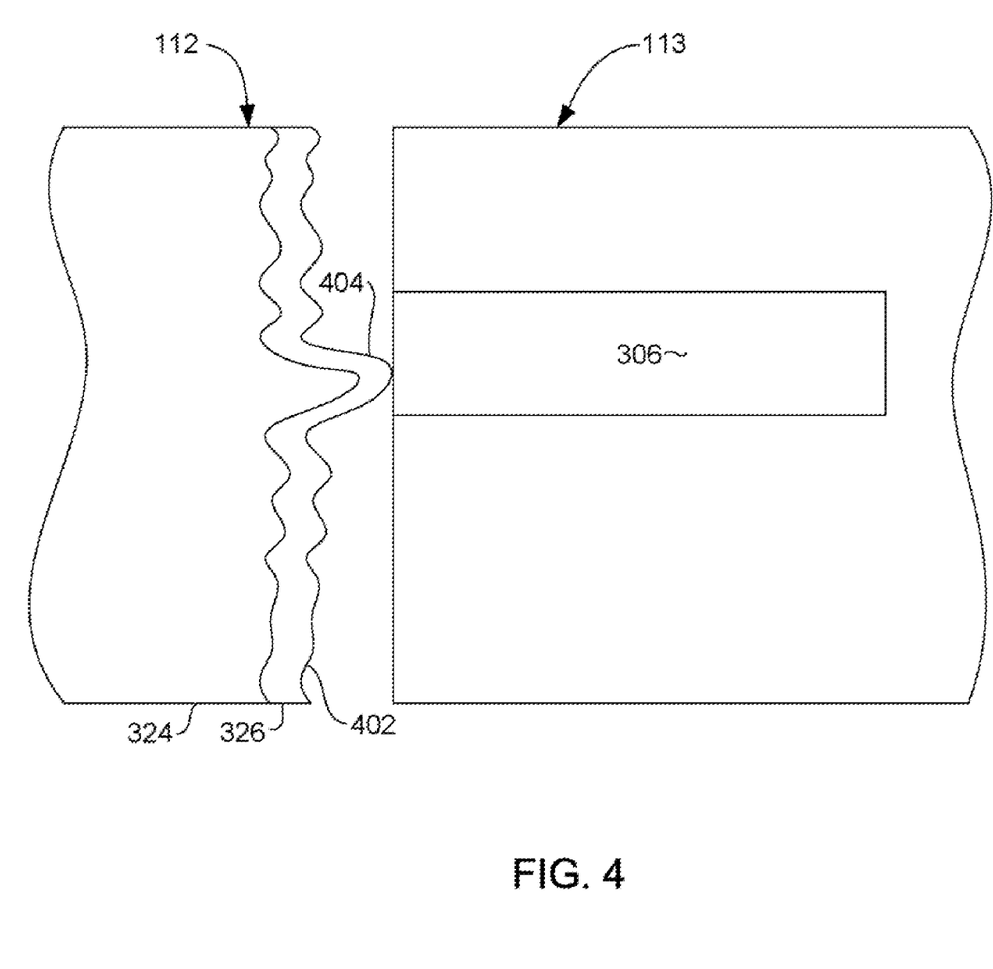
FIG. 4 is an enlarged view of a magnetic head and an adjacent magnetic media having a thermal asperity.

With reference now to FIG. 4, an enlarged view of a portion of the magnetic disk 112 and slider 113 is shown. As can be seen, at very large magnifications the surface 402 of the magnetic disk 112 is not actually perfectly flat, but has a certain amount of surface roughness. Although the disk is preferably made as smooth as possible, some amount of surface roughness is inevitable. In addition, the surface 402 of the disk 112 can include one or more thermal asperities 404. A thermal asperity 404 is a portion of the disk that sticks out above the rest of the surface 402. The slider 113 flies at an extremely low height over the disk surface 402 of the disk 112. This raises the possibility that the slider 113 can actually come into contact with the asperity 404. The friction from this contact causes a temporary rise in the temperature of the sensor 306. The increased temperature, in turn, increases the electrical resistance of the sensor 306. This thermally induced increase in resistance of the sensor 306 causes a perturbation in read signal. FIG. 6 shows a read signal 602 of a head that has come into contact with a thermal asperity such as the thermal asperity 404 described with reference to FIG. 5. As shown in FIG. 6, the read signal 602 exhibits a temporary rise in resistance resulting in a thermal spike 604 in the signal. As can be seen, the thermally induced spike 604 may rise somewhat quickly, and can be sustained for a short period while the sensor remains heated, then tapers downward as the sensor cools. It should be pointed out that the signal 602 is an example of a spike that results from contact with a thermal asperity where the carbon overcoat (COC) 326 has not been worn off.

Figure 5:
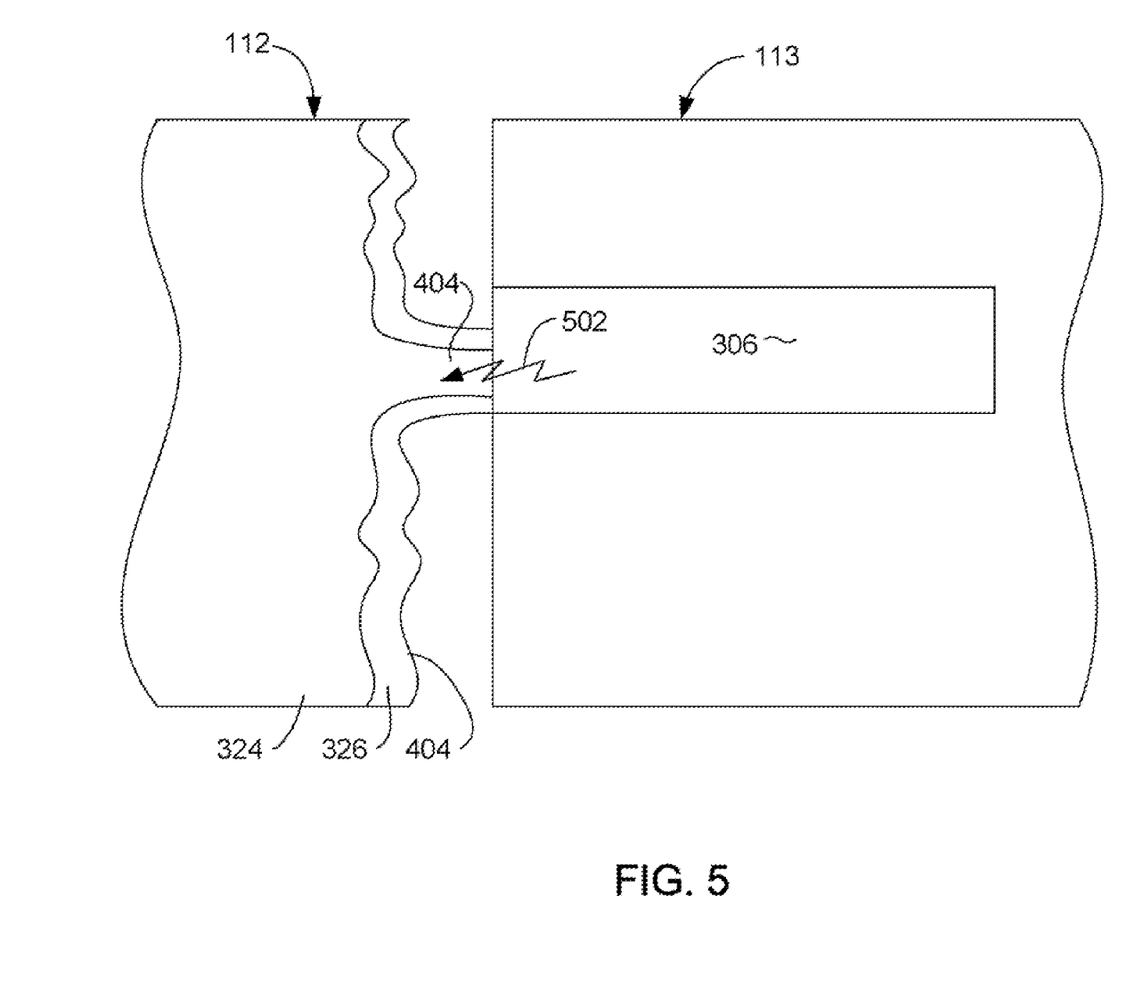
FIG. 5 is an enlarged view of a magnetic head and adjacent magnetic media having a degraded carbon overcoat.
Figure 6:
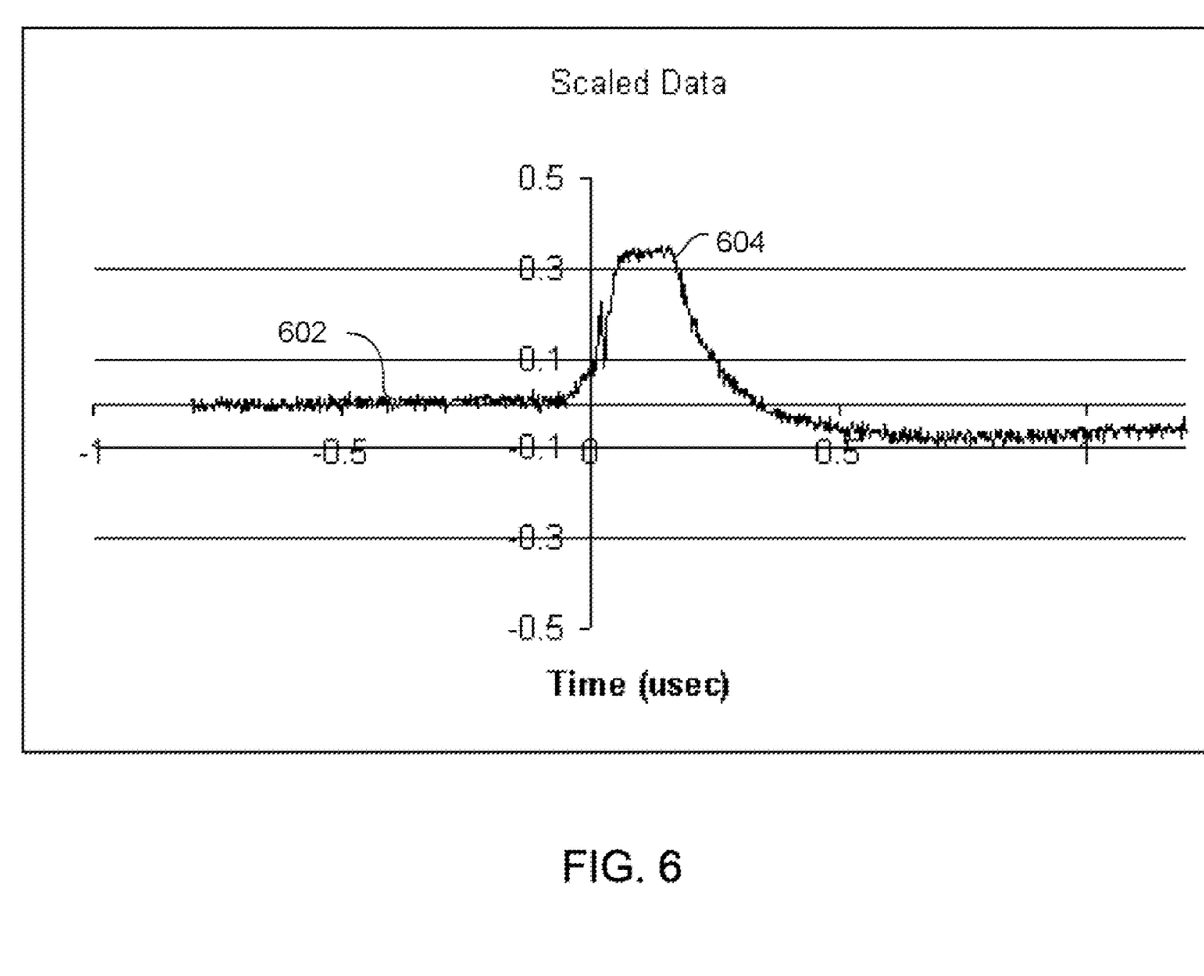
FIG. 6 is a graph showing a read signal from a magnetoresistive sensor in response to a contact with a thermal asperity of a magnetic media.

With reference now to FIG. 5, a disk 112 is shown, wherein the carbon overcoat (COC) has been worn off. This could occur at any location on the disk, 112, but more commonly occurs at the site of a thermal asperity 404, where contact with the slider 113 has worn off the COC 326 at the location of the thermal asperity 404.

As can be seen, the localized absence of the COC allows the sensor 306 (or other portions of the slider 113) to come into contact with the electrically conductive magnetic layer 324 of the disk 112. This causes an electrical short 502 between the sensor 306 and the magnetic layer 324. This short causes a negative signal spike 702 as shown in FIG. 7.

Figure 7:
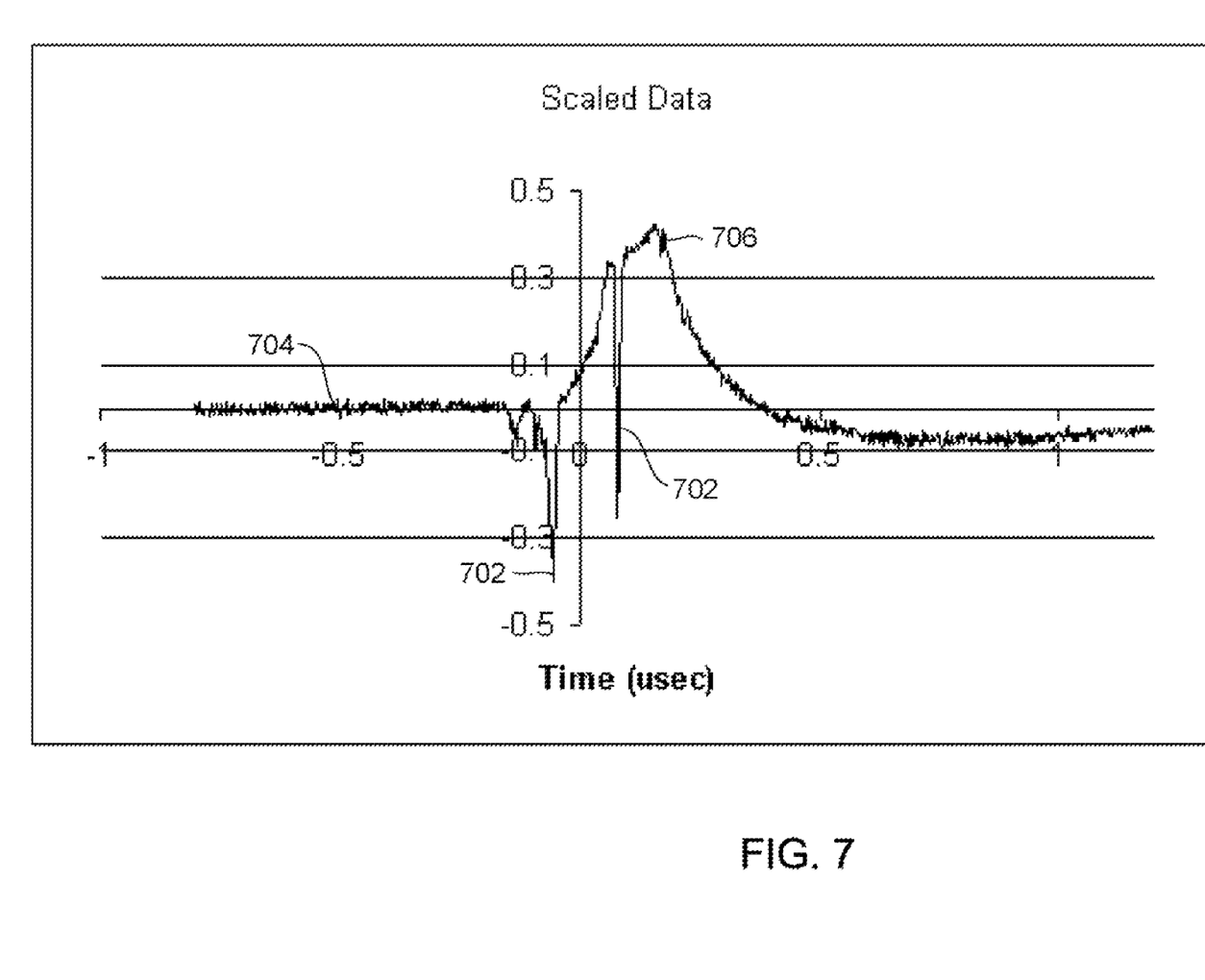
FIG. 7 is a graph showing a read signal from a magnetoresistive sensor in response to a contact with a media having a degraded carbon overcoat.

FIG. 7 shows a signal 704 from a magnetoresistive sensor flying over a disk having Carbon Overcoat degradation. At the point where the sensor makes contact with the disk (i.e. where the COC has been worn off), the resulting shorting causes the signal to drop dramatically, only for the time that the sensor is shorted to the magnetic layer 324 of the disk 112 (FIG. 5). As can be seen, the resulting negative spike 702 is much more steep and short than the thermal spike 604 described with reference to FIG. 4. In addition, the short induced spike 702 is a negative spike resulting from a decrease in resistance as opposed the thermal spike 604 which is generally in a positive direction, being the result of a thermally induced increase in sensor resistance.

As discussed above, carbon overcoat degradation often occurs in a region of a thermal spike. Therefore, as seen in FIG. 7, the COC degradation spike 702 may be located within a thermal spike 706. In addition, multiple COC degradation spikes 702 may be present in the same region, because the COC may have been completely worn off in more than one location in the same region.

Figure 8:
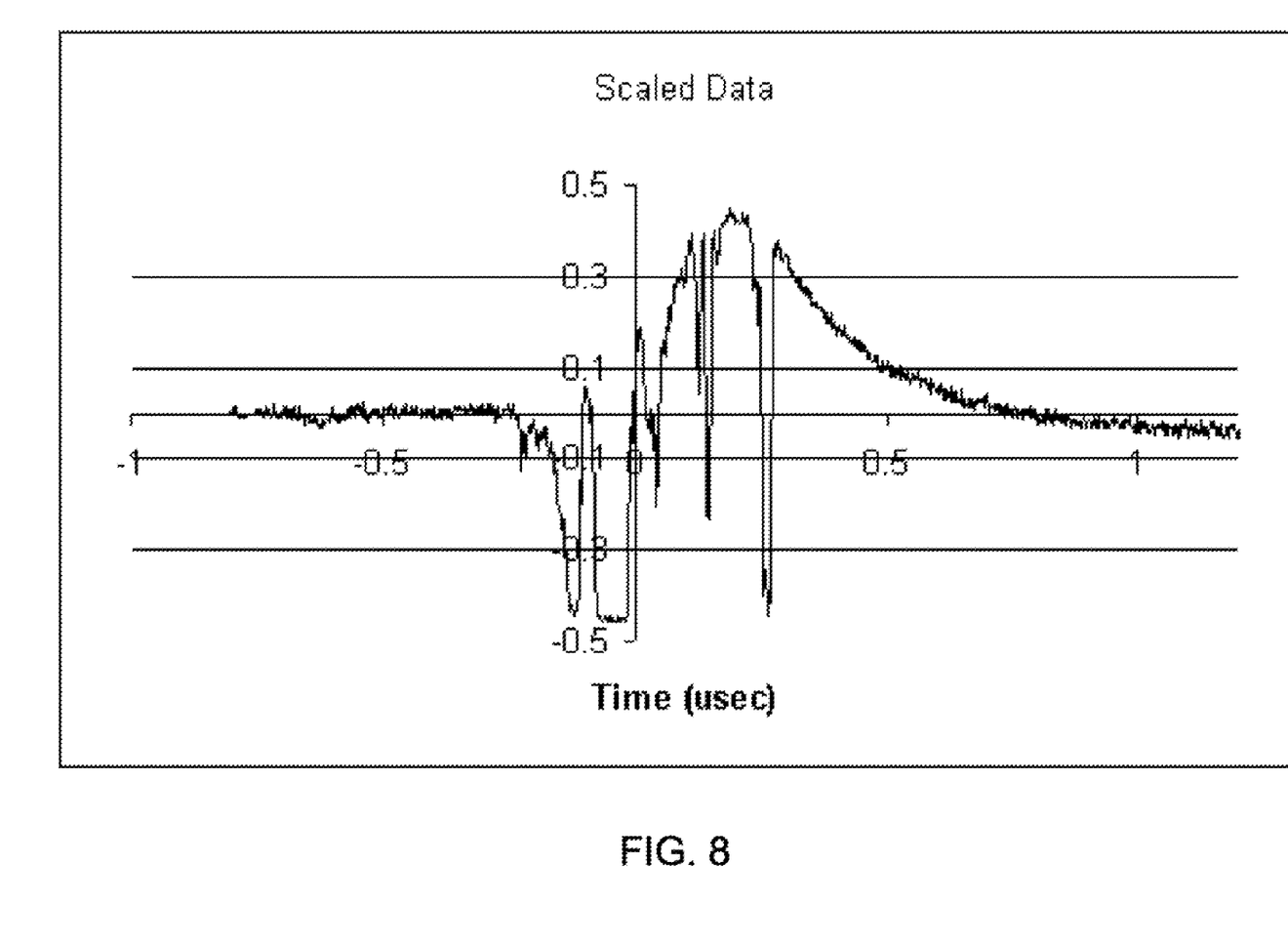
FIG. 8 is a graph showing a read signal from a magnetoresistive sensor in response to contact with a media having a degraded carbon overcoat and after an extended period of time.

FIG. 7 shows a signal 704 when COC degradation has just begun to occur. As can be seen in FIG. 7, there are only two significant downward spikes 702. FIG. 8 on the other hand, shows a signal 802 after prolonged use with COC degradation. As the COC degradation worsens, the greater number and size of exposed regions of magnetic layer result in significantly increased numbers of downward COC degradation spikes 702. Eventually, continued use of the disk drive system will result in complete failure as the sensor becomes completely destroyed by contact with the magnetic layer of the disk.

Therefore, as can be seen, the detection of a downward spike in the read signal of a magnetoresistive sensor provides an accurate indication of COC degradation. Detecting such COC degradation gives an operator an opportunity to save data to some other data storage device (i.e. back up data) before complete failure occurs, thereby saving the immeasurable cost and frustration that can accompany a loss of critically important data. A system for detecting for COC degradation can be implemented into a data recording system by incorporating software or hardware into the channel electronics (e.g. 125 in FIG. 1).

Figure 9:
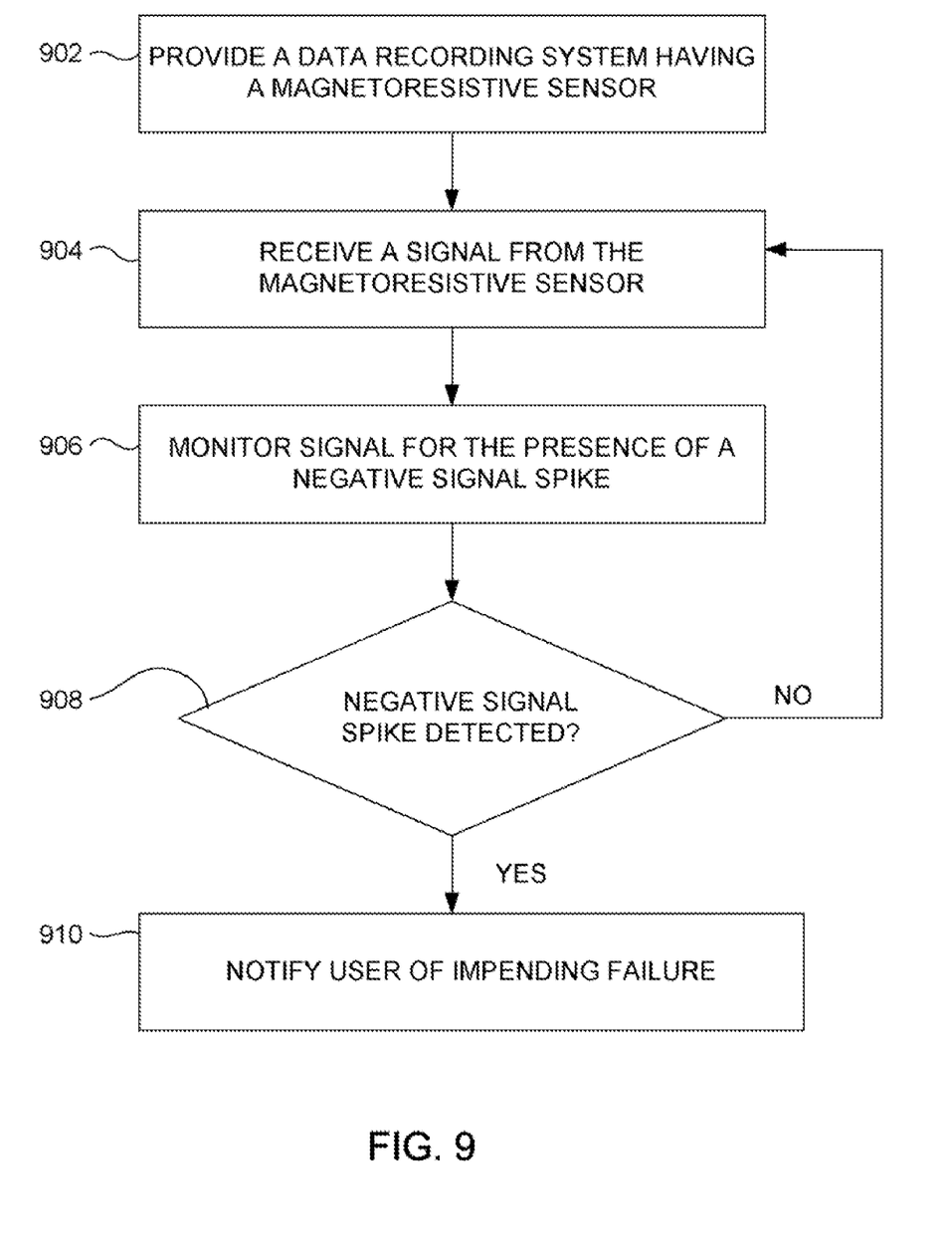
FIG. 9, is a flowchart illustrating a method for detecting COC degradation.

With reference now to FIG. 9, a method for detecting COC degradation can be summarized as follows. In a step 902 a magnetic data recording system is provided. The data recording system includes a magnetoresistive sensor that can read a magnetic signal from a magnetic medium and produce an electrical signal corresponding to the magnetic signal from the magnetic medium. As described above, the magnetic medium has a hard over layer such as a carbon overcoat.

Then, in a step 904 the electrical signal from the magnetoresistive sensor is received and processed, and in a step 906 the received signal is monitored for the presence of a negative signal spike. In a decision step 908, a determination is made as to whether a negative signal spike has been received. If no negative signal spike has been received, steps 904 and 906 are continued. If a negative signal spike is received then, in a step 910 a user is notified of an impending failure. In addition to or in lieu of notifying a user of an impending failure, the data recording system can be de-activated in order to prevent further damage to the system components and in order to prevent data loss.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for detecting impending failure of a magnetic data recording system, comprising:

providing a data recording system including a magnetoresistive sensor;
providing a magnetic medium having an electrically insulating overcoat formed over a magnetic layer;
receiving a signal from the magnetoresistive sensor;
monitoring the signal for the presence of a short duration negative signal spike located within a longer duration positive signal spike, the negative signal spike indicating a localized absence of the electrically insulating overcoat and the positive signal spike indicating thermal heating resulting from contact with an asperity formed on the magnetic medium; and
if a negative signal spike is detected within a longer duration positive signal spike, sending a notification of an impending failure and deactivating the magnetic data recording system.

2. A method as in claim 1 wherein the negative signal spike indicates a sudden drop in electrical resistance of the magnetoresistive sensor.

3. A magnetic data storage system comprising:

a magnetic medium;
a magnetoresistive sensor for reading a magnetic signal and producing an electrical signal corresponding to the magnetic signal;
a magnetic medium having an electrically insulating overcoat over a magnetic layer;
channel electronics circuitry for processing the electrical signal from the magnetoresistive sensor; and
logic for detecting a short duration negative signal spike in the electrical signal, located within a longer duration positive signal spike the negative signal spike indicating the presence of a localized absence of the electrically insulating overcoat and the longer duration positive signal spike indicating thermal heating resulting from contact with a thermal asperity, and deactivating the magnetic data storage system if a negative signal spike has been detected.

4. A magnetic data storage system as in claim 3 wherein the logic for detecting a negative signal spike in the electrical system is incorporated into the channel electronics circuitry.

5. A magnetic data storage system as in claim 3 further comprising logic for notifying a user of an impending failure if a negative signal spike is detected.

6. A magnetic data storage system as in claim 3 wherein the electrically insulating overcoat comprises carbon.

7. A magnetic data storage system as in claim 6 wherein the presence of a negative signal spike indicates degradation of the carbon overcoat.

8. A magnetic data storage system as in claim 6 further comprising logic for alerting a user of degradation of the carbon overcoat if a negative signal spike is detected.

9. A magnetic data storage system as in claim 3 further comprising logic for notifying a user of an impending failure and deactivating the magnetic data storage system if a negative signal spike greater than a predetermined amplitude value is detected.

* * * * *

UNITED STATES PATENT AND TRADEMARK OFFICE
CERTIFICATE OF CORRECTION

PATENT NO. : 7,957,083 B2  
APPLICATION NO. : 11/781898  
DATED : June 7, 2011  
INVENTOR(S) : Albert John Wallash et al.

Page 1 of 1

It is certified that error appears in the above-identified patent and that said Letters Patent is hereby corrected as shown below:

In the Specification:

Column 5, line 48 replace "embodiments failing" with --embodiments falling--.

Signed and Sealed this  
Twenty-ninth Day of September, 2015

Michelle K. Lee  
*Director of the United States Patent and Trademark Office*